Oct. 4, 1960   C. G. A. SWANSON   2,954,869
EXTRUSION PRESS
Filed Aug. 14, 1957   7 Sheets-Sheet 5
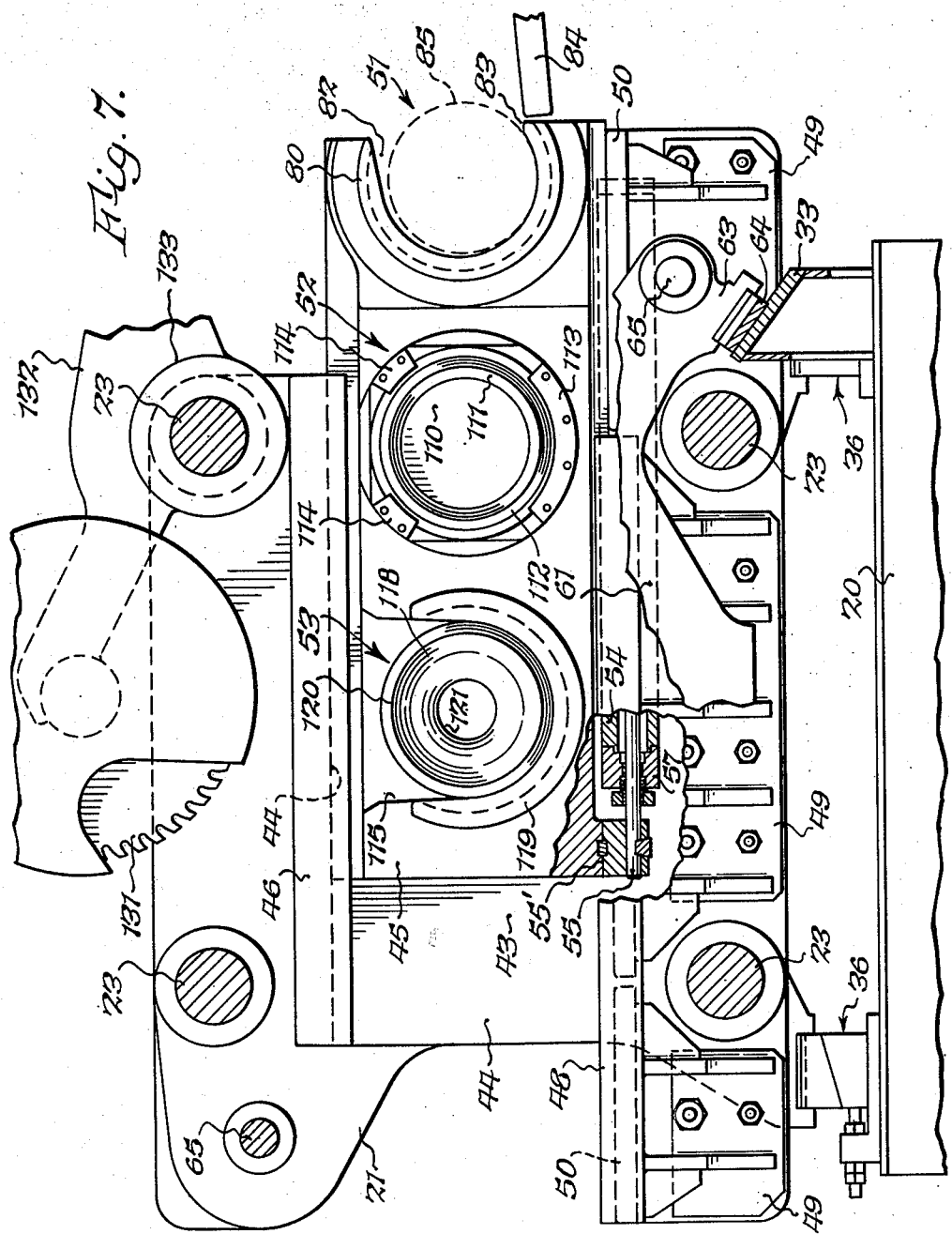
INVENTOR.
Carl G. A. Swanson
BY
Popp and Sommer
Attorneys.

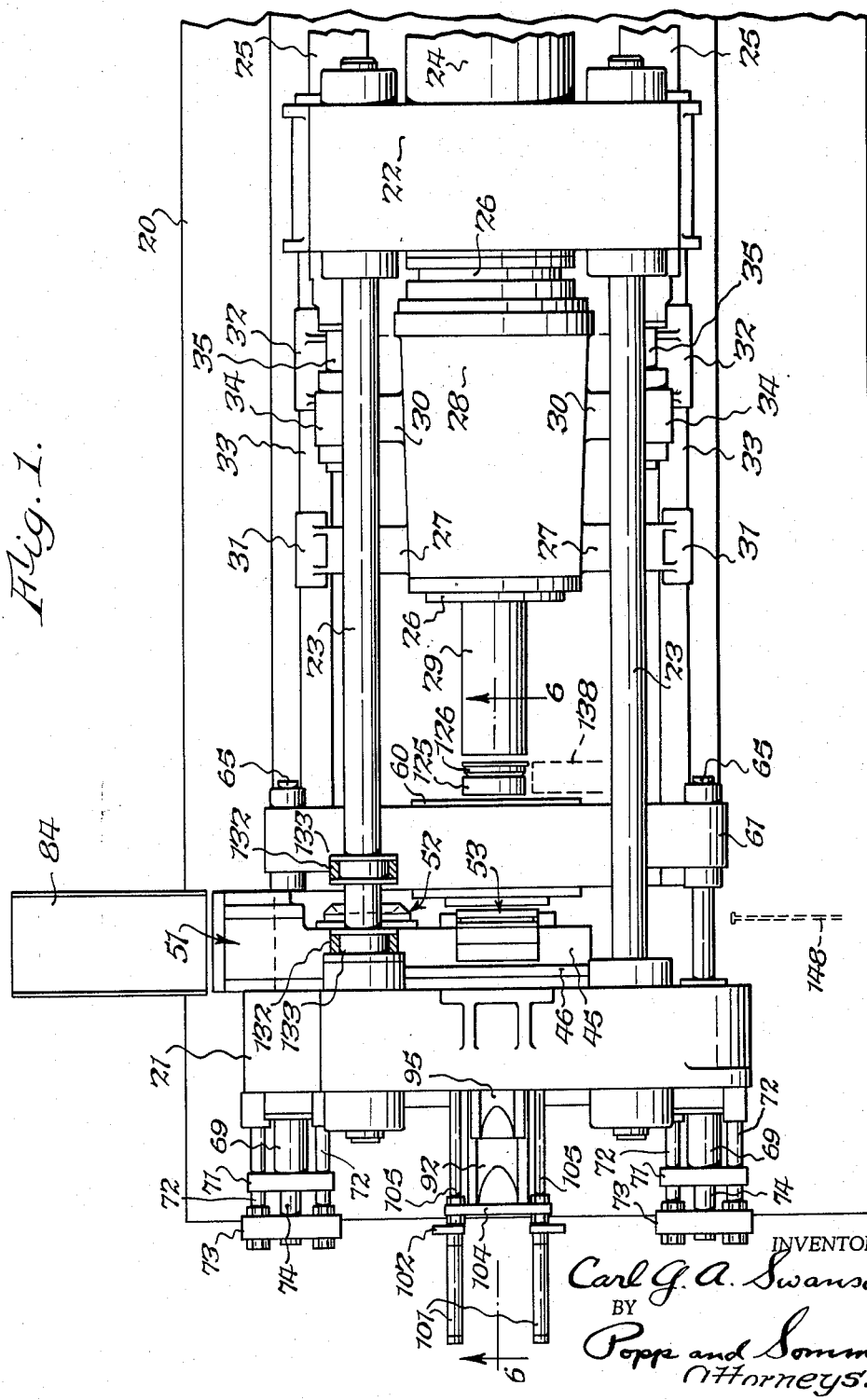

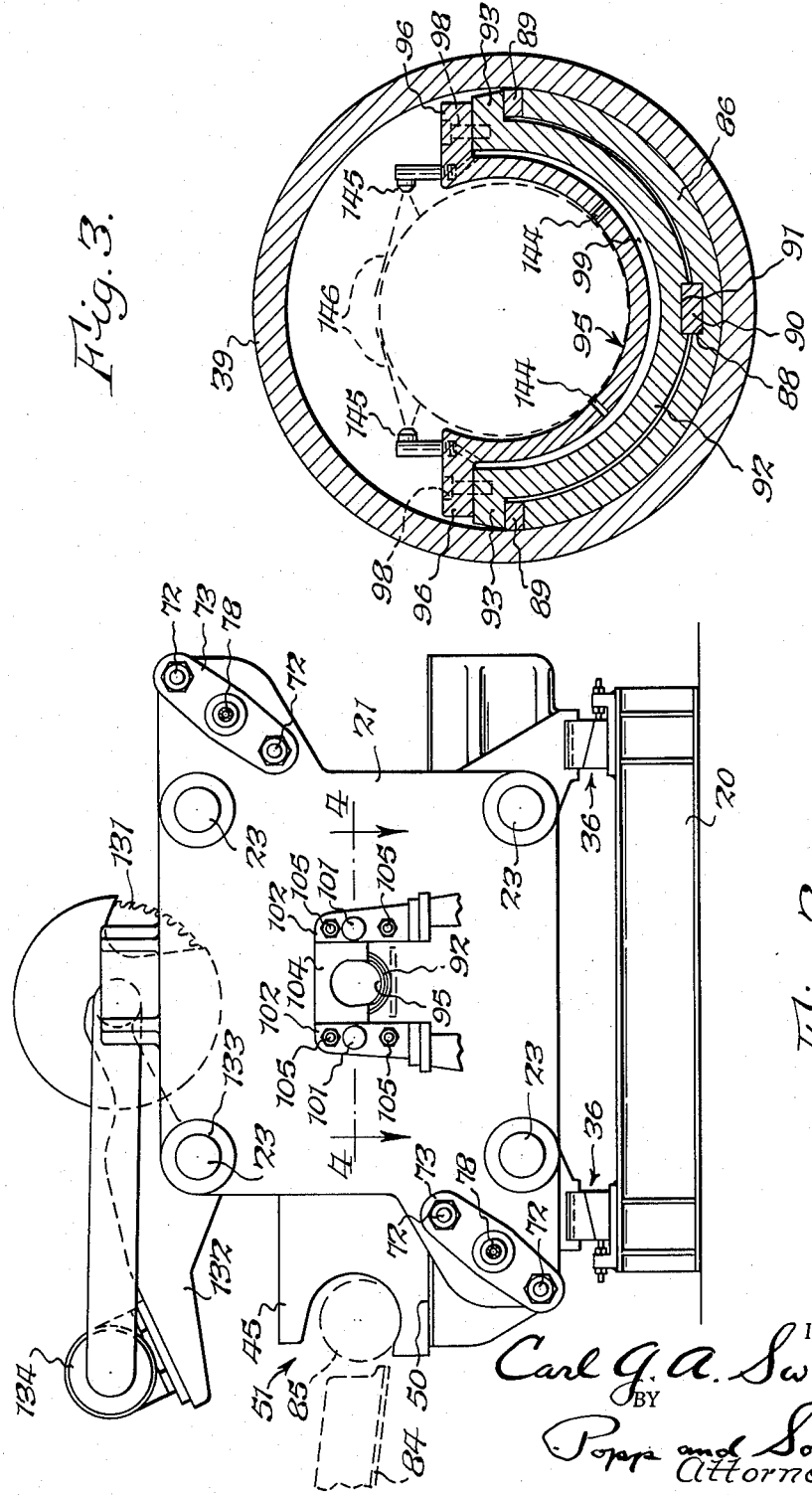

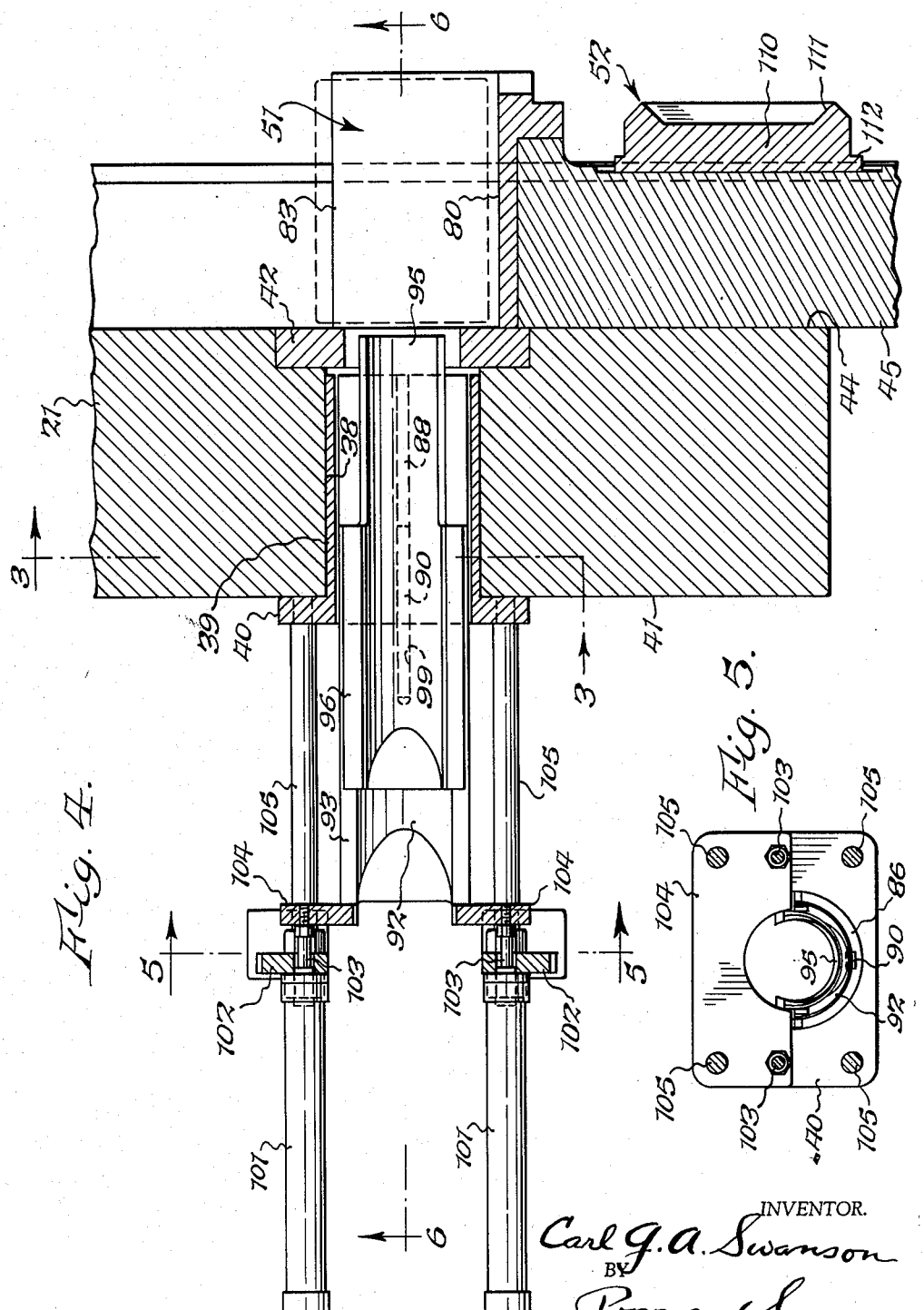

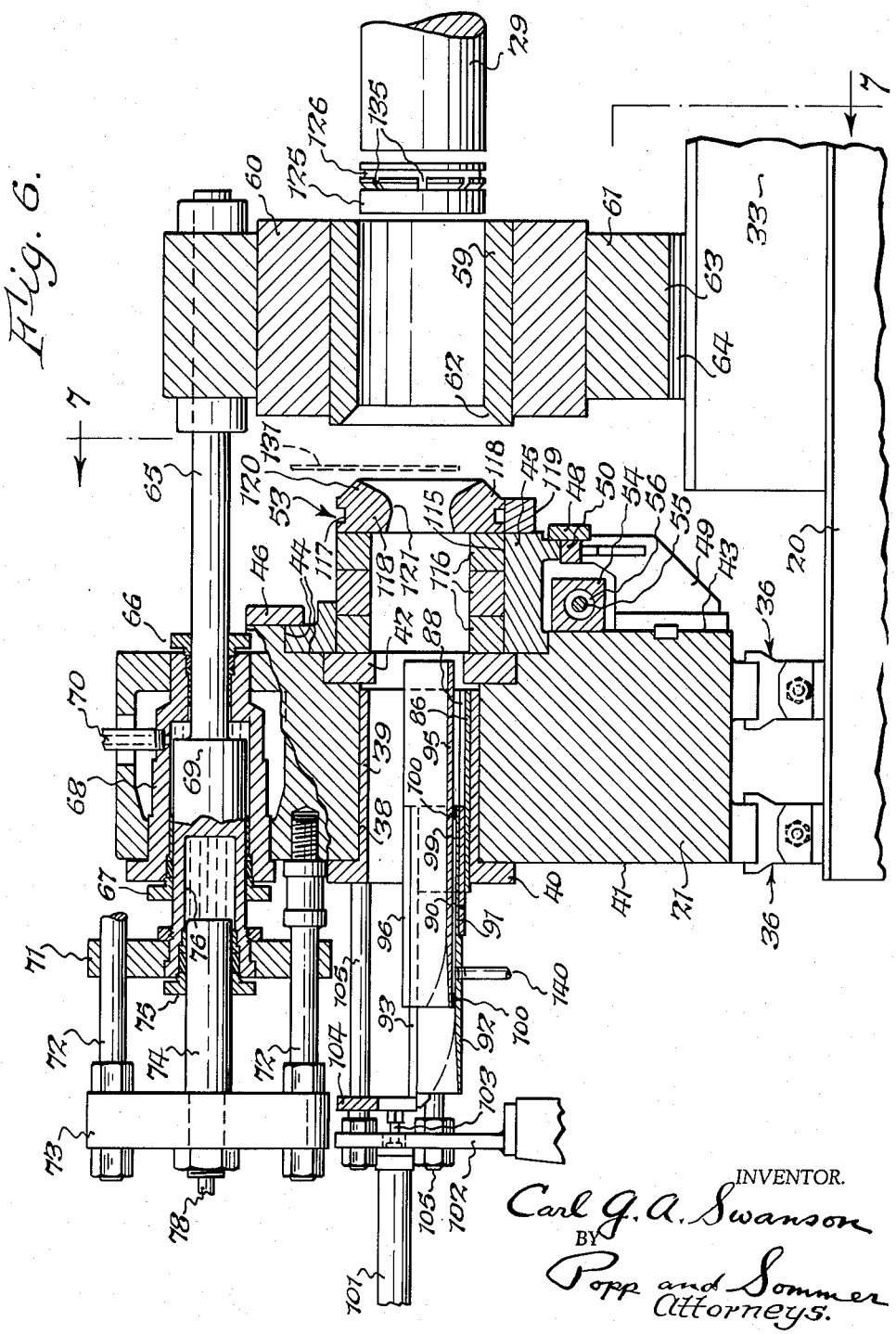

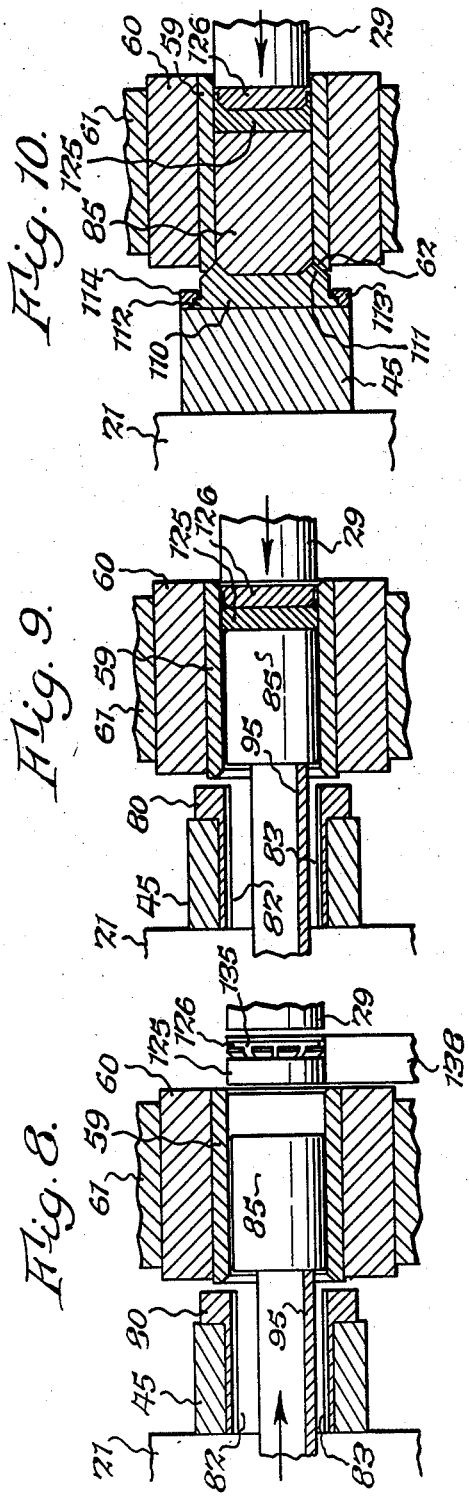
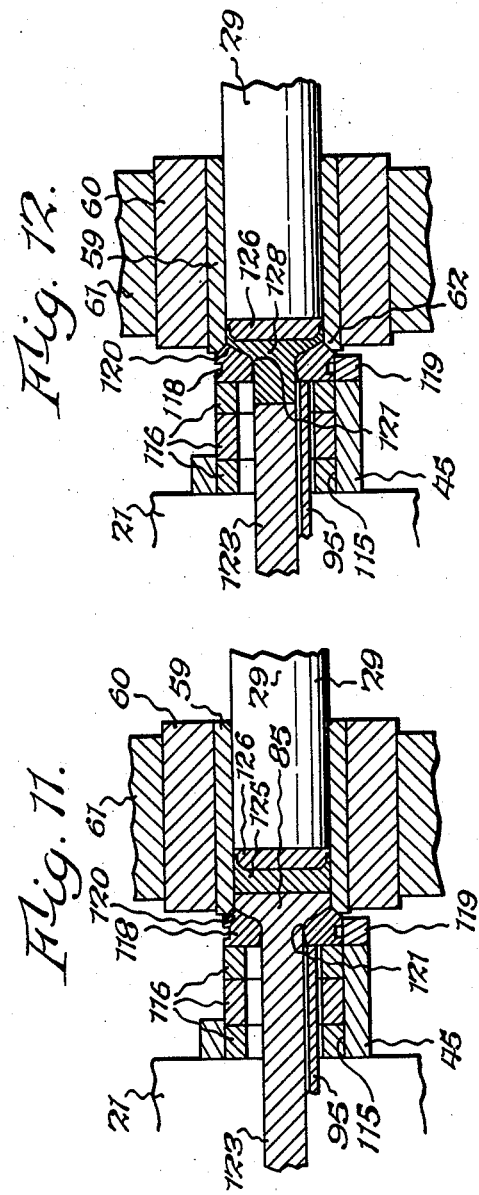

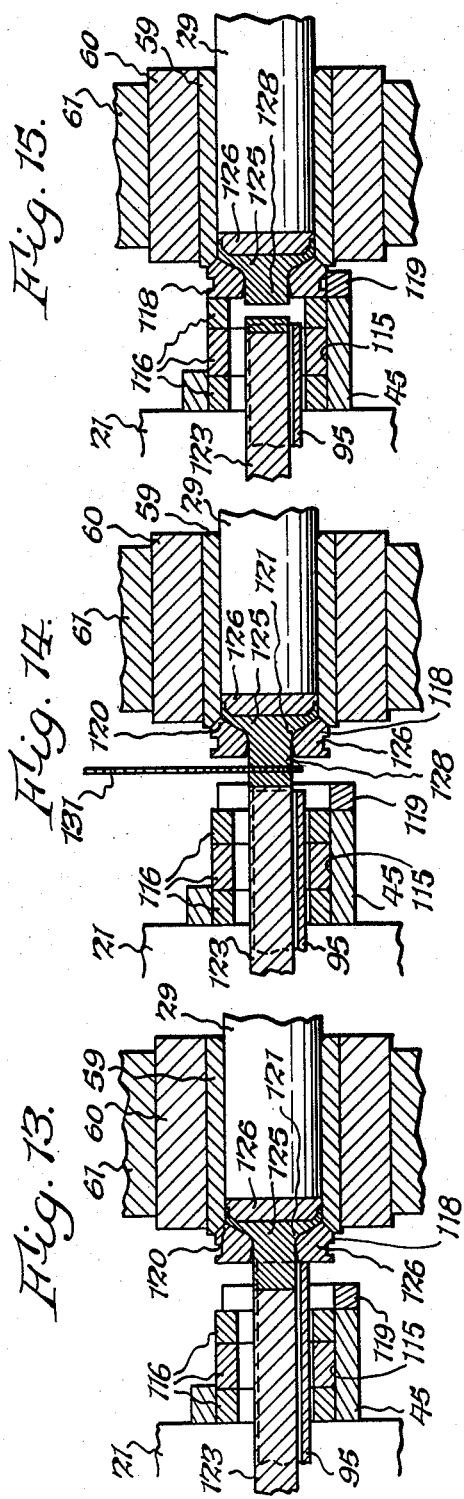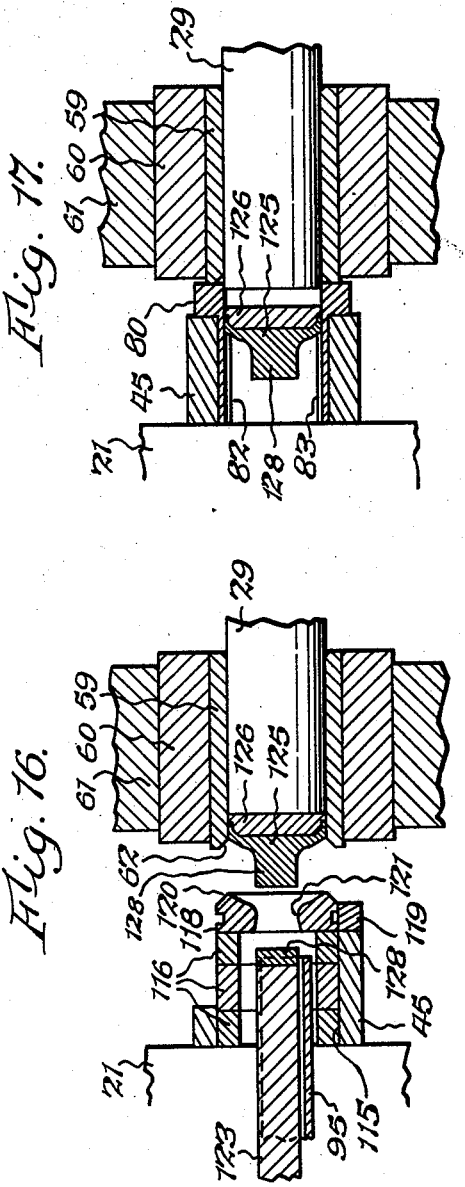

United States Patent Office 2,954,869
Patented Oct. 4, 1960

2,954,869
EXTRUSION PRESS

Carl G. A. Swanson, Kenmore, N.Y., assignor to Lake Erie Machinery Corporation, a corporation of New York Filed Aug. 14, 1957, Ser. No. 678,208

2 Claims. (Cl. 207—2)

This invention relates to an extrusion press and more particularly to a heavy duty horizontal hydraulic press for producing extrusions from large billets.

In heavy duty horizontal extrusion presses it is conventional practice in loading the billet to withdraw the main plunger from the billet container and thereafter, through a billet loader, bring the billet into axial alinement with the main plunger and container, following which the main plunger is advanced to push the billet into the container. For large and heavy billets a large and bulky billet loader is required, and this requires excessive travel of the main plunger in order to get it out of the way for operation of the billet loader.

Important objects of the present invention are to avoid such excessive movement of the main plunger and hence to increase the speed and capacity of the extrusion press, this being essentially accomplished by loading the billet into the container from the side opposite the main plunger.

Another object is to provide a simple, rapid and reliable mechanism for so loading the billet into the container from its side remote from the main plunger, this being accomplished by the provision of a horizontal slide having at one end an open-sided mouth into which the billet can be conveniently loaded from a glass table or chute and which is rapidly moved to bring the mouth into alinement with the container into which the billet is transferred.

Another object is to use the billet loading slide for other functions, namely, to present an upsetting die to the billet; to present the extrusion die to the billet; to remove the used die to a place where it can be replaced with a fresh die; or to receive the discard and remove it to a place where it can be ejected.

Another object is to provide a pusher for transferring the billet from the slide to the container and which also serves other purposes, namely, to guide the extrusion just formed; to move the die and the attached extrusion backwardly for the purpose of severing the discard with the die attached; or to spray coolant on the extrusion as it emerges from the die so as to rapidly harden the same or improve its physicals.

Other objects and advantages of the invention will be apparent from the following description and drawings in which:

Fig. 1 is a fragmentary top plan view of an extrusion press embodying the present invention.

Fig. 2 is an elevational view thereof, viewed from the left hand end of Fig. 1.

Fig. 3 is a vertical transverse section, on an enlarged scale, this section being taken on line 3—3, Fig. 4.

Fig. 4 is an enlarged fragmentary horizontal section taken generally on line 4—4, Fig. 2.

Fig. 5 is a transverse section taken generally on line 5—5, Fig. 4.

Fig. 6 is a fragmentary vertical longitudinal central section taken generally on line 6—6, Figs. 1 and 4, this view also being broken away to show, in section, a piston and cylinder structure 68, 69 beyond the center line of the press.

Fig. 7 is a fragmentary vertical transverse section taken generally on line 7—7, Fig. 6.

Figs. 8 through 17 inclusive are enlarged fragmentary vertical sectional views similar to Fig. 6 and illustrating the sequence of operations in producing an extrusion.

The extrusion press forming the subject of the present invention is mounted on a bed 20 and the main section of the press comprises a die platen 21 and a cylinder platen 22 securely held together at the four corners thereof by four large horizontal columns 23. The usual horizontal main cylinder 24 and pullback cylinders 25 are fixed to the cylinder platen 22. The forward end of the main ram 26 is supported on a main ram cross head or moving platen 28 and terminates in a main plunger 29. This moving platen or main ram cross head 28 has a pair of forward outwardly and downwardly diverging side legs 27 and a pair of rear outwardly and downwardly diverging side legs 30 which are respectively supported by feet 31, 32 which are supported to slide along rails 33 on opposite sides of the base 20. This movable platen or main ram cross head 28 is also provided with a pair of side arms 34 which are secured to the outer ends of the piston rods 35 of the pistons within the pullback cylinders 25.

As best shown in Figs. 2, 6 and 7 the die platen 21 is supported at each of its four corners on wedge devices 36 which can be adjusted to wedge up or lower the corresponding corner of the die platen. As best shown in Fig. 6, the die platen is provided with a central through bore 38 containing a flanged sleeve 39, the flange 40 of which is arranged against the rear face 41 of the die platen. A large die back-up block 42 is mounted in a counterbore at the opposite end of the bore 38 and the adjacent face 43 of the die platen is formed to provide a horizontal guideway 44 which extends transversely of the press and in which the upper part of a large slide 45 is slidingly retained by a retaining bar 46 secured along the top of the slideway 44 to project downwardly across the top of the slide 45 in the slideway and retain the slide in place as best shown in Figs. 6 and 7. The lower part of the slide 45 is retained in the slideway 44 by a retaining bar 48. This retaining bar is removably secured, in any suitable manner, to a plurality of brackets 49 which are secured, at spaced intervals across the press, to the lower part of the face 43 of the die platen 21. These brackets 49 also support a plurality of horizontal rails 50 which extend in end-to-end relation transversely of the press and additionally slidingly support the slide 45 as best shown in Fig. 6.

The slide 45 contains three horizontally spaced stations, namely a billet receiving and transfer station 51 at one extremity of the slide; an upset station 52 at the center of the slide; and an extrusion die station 53 at the opposite end of the slide. The slide is movable to successively bring these stations into line with the bore 38 which is coincident with the axis of extrusion and for this purpose a horizontal cylinder 54, which is square in external cross section, as best shown in Figs. 6 and 7, is secured to the face 43 of the die platen 21 immediately below the slide 45 and above the brackets 49. The piston rod 55 of the piston 56 in this cylinder projects through an end cap 57 and is anchored, as indicated at 55', to the bottom of the left hand end of the slide 45 as viewed in Fig. 7. By controlled introduction of pressurized fluid into one end or the other of the cylinder 54, the slide 45 can be moved to present each of its stations 51, 52, 53 into alinement with the opening 38 of the cylinder platen 21.

In so alining with the opening 38 of the cylinder platen 21, each station 51, 52 and 53 also alines with the cylindrical liner 59 of a billet container 60 held by a container holder 61. The end of the container liner 59 opposing the die platen 21 is provided with a conical internal bevel 62 for a purpose which will presently appear. This container holder has side legs 63 (Figs. 6 and 7) which have pads 64 which slide along the side rails 33 of the press.

To reciprocate the container holder 61 along the rails 33, a pair of piston rods 65 are fast to this container holder and extend toward the die platen 21. As shown in Fig. 7 two of such piston rods 65 are provided, one at the upper left and one at the lower right of the container holder 61, as viewed in Fig. 7. Each piston rod 65 extends through a stuffing box 66 (Fig. 6) at one end of a cylinder 68 and connects with a piston 69 therein. This piston is surrounded by a stuffing box 67 and the stuffing boxes 66, 67 are held in place in the conventional manner, that is, by the threads shown. The opposite end of each piston 69 projects from the opposite end of its cylinder 68 and a fluid line 70 connects with the piston rod end of each cylinder 68 so that upon introducing pressurized fluid through these lines into the cylinders 68, the pistons 69, piston rods 65 and container holder 61 will be moved to the left, as viewed in Fig. 6.

The outer end of each piston 69 carries a cross head 71, the opposite ends of which are guided to slide along rods 72 anchored in and projecting from the die platen 21 parallel with the piston rods 65. The outer ends of each pair of these fixed guide rods carry a fixed cross head 73 which in turn carries a fixed piston 74 projecting through a stuffing box or gland 75 into a blind bore 76 in the projecting end of the corresponding piston 69. The stuffing box 75 is also held in place in the conventional manner, that is, by the threads shown. A fluid pressure line 78 connects through each fixed piston 74 with each bore 76 and it will be seen that upon introducing pressurized fluid through the lines 78 and fixed pistons 74 into the bores 76, the pistons 69, piston rods 65 and container holder 61 will be moved to the right as viewed in Fig. 6.

The billet receiving station 51 is at one end of the slide 45 and at this station a semicylindrical billet receiving shell 80 is suitably secured in a corresponding semicylindrical recess at this end of the slide so that the open mouth 82 of the semicylindrical shell 80 opens horizontally at the end of the slide in the direction of movement of the slide. The semicylindrical shell 80 is set so as to have a slightly raised lower lip 83 which alines with a glass table or loader 84 for the billet 85 and which is shown as being of cylindrical form, the lip 83 restraining the cylindrical billet from rolling out of the mouth 82 as the slide 45 is withdrawn from the glass table 84.

After a billet has been loaded from the glass table 84 into the open mouth 82 of the semicylindrical shell 80, the slide is moved to bring this billet and shell into line with the liner 59 for the container 60 and the billet is pushed axially from this shell 80 into the liner 59 by apparatus which is preferably constructed as follows:

The numeral 86 represents a semicylindrical liner fixed in the lower half of the flanged sleeve 39 in the opening 38 of the die platen 21 as best shown in Figs. 3 and 6. This semicylindrical liner has an upwardly facing keyway 88 along its bottom and also has slide or wear strips 89 attached to its upper edges. A key 90 which also functions as a slide or wear strip, in the keyway 88 also fits in a downwardly facing keyway 91 in an outer, semicylindrical cradle or pusher member 92 which is thereby capable of reciprocation axially along the sleeve 39. This semicylindrical member in addition to being slidingly supported through the key 90 which slides in the keyway 88 is also slidingly supported on the slide or wear strips 89. For this purpose the semicylindrical cradle or pusher member is provided along its upper longitudinal edges with outwardly projecting flanges 93 which ride on the slide or wear strips 89 as best shown in Fig. 3.

Within this outer semicylindrical cradle or pusher member 92 is secured an inner semicylindrical cradle or pusher member 95, the latter having, for this purpose, radially outwardly extending flanges 96 along its upper longitudinal edges which are secured, as by screws 98 to the upper flanges 93 of the outer cradle or pusher member 92. The inner and outer semicylindrical pusher or cradle members 92, 95 are preferably offset longitudinally with reference to each other, as illustrated in Fig. 6, and are spaced from each other to provide a semicylindrical chamber 99 therebetween, this chamber being suitably closed at its ends as indicated at 100. The end of the inner semicylindrical pusher or cradle member 95 is arranged to enter the semicylindrical billet receiving shell 80 to push the billet axially therefrom into the liner 59 of the container. This movement is effected by a pair of pistons in cylinders 101 which flank the path of the extrusion emerging from the press and are mounted on stands 102.

The piston rods 103 of these pistons are connected with a bridge-like generally rectangular end head 104 having depending sides which are secured to the outer ends of the outwardly projecting flanges 93 of the outer semicylindrical cradle or pusher member 92. As best shown in Figs. 1, 4, 5 and 6, each stand 102 is preferably strengthened by being secured to a horizontal rod 105 which is anchored in the die platen 21, these rods resisting the force imposed upon the stands 102 in pushing the billet into the container 60. The arching end head 104 of the outer semicylindrical pusher or cradle member 92 is also guided along these rods 105 as best illustrated in Fig. 5.

Means are provided for upsetting the billet 85 prior to extrusion, such upsetting comprising filling the billet container liner 59 by compressing the billet axially so as to expand it radially. For this purpose, at the upsetting station 52 the slide 45 has removably secured thereto an upset die 110. As best shown in Figs. 7 and 10 this upset die 110 is secured to the face of the slide 45 which opposes the billet container 60 and is provided with an annular ridge 111 which fits into the bevel or conical end recess 62 of the container liner 59 so as to completely block the end of this liner as best shown in Fig. 10. The upset die 110 can be removably secured in any suitable manner as by having an annular flange 112 clamped by an arcuate clamp 113 removably attached to the slide 45 with the upper portions of the flange 112 secured by a pair of similar but shorter arcuate clamps 114.

At the extrusion station 53 the slide 45 is provided with an upwardly opening recess 115 containing a series of annular backup blocks 116 for an extrusion die 118 held by a semicircular or horseshoe-shaped die holder 119 fixed to the side of the slide 45 opposing the container 60. This die is provided with an external annular groove 117. The die 118 can be lifted from the semicircular or horseshoe-shaped die holder 119 and can also be moved axially from the die holder for a purpose which will presently appear. The die is provided with a circular ridge 120 which is similar to the ridge 111 on the upset die 110, hence fitting and sealing against the conical recess or bevel 62 in the container liner 59 and the die 118 has an opening 121 conforming to the outline of the extrusion 123 being produced.

Means are provided for feeding a follower 125 and dummy block 126 into the liner 59 for the billet container 60 along with the billet 85. The follower can be a disk of graphite or of a low cost metal, as compared with the value of the extrusion 123, and which will not melt under the conditions of extrusion. Its purpose is to produce, at the trailing end of the extrusion 123, a discard 128 of low cost material which can be sawed from the extrusion 123 by means of a rotary saw 131 mounted on the end of a swinging arm 132 which can be pivoted to the platen 21 at 133, the rotary saw 131 being driven by an electric motor 134. Such a saw for severing the discard is illustrated in greater detail in the Thweatt and Swanson Patent 2,728,453, dated December 27, 1955, for Extrusion Press and to which reference is made for a more detailed description.

The dummy block 126 is of circular form to closely fit in the bore of the liner 59 of the billet container 60 and is provided with forwardly extending marginal recesses 135 around which the material forming the follower 125 can flow so as to secure the dummy block 126 to the trailing end of the extrusion and hence to the discard 128 produced when the trailing end of the extrusion is sawed off. The follower 125 and dummy block 126 can be brought into line with the liner 59 of the billet container 60 by any suitable loader the arm of which is indicated generally at 138 in Figs. 1 and 8. A loader suitable for this purpose is described in detail in the Hess and Swanson application, Serial No. 510,921 filed May 25, 1955 for Billet Loader and to which reference is made for a more detailed description of such loader.

With some extrusions it is desirable to cool rapidly the extrusion 123 as it emerges from the opening 121 of the die 118 by spraying a coolant or quenching liquid thereon. Such quenching is particularly useful in producing a straight or undistorted extrusion 123 or in improving its physicals.

For this purpose such quenching liquid can be supplied, as through a line 140, Fig. 6, to the space of semicylindrical chamber 99 between the inner and outer semicylindrical pusher or cradle members 92, 95. From this semicylindrical chamber 99 the coolant can be projected against the extrusion emerging from the die 118 in any suitable manner. As shown in Fig. 3 the inner semicylindrical pusher or cradle member 95 can be provided with a series of ports or orifices 144 extending therethrough so as to project liquid from the chamber 99 directly against the underside of the extrusion 123 passing thereover. Also a series of nozzles 145 can be mounted on each flange 96 and supplied with coolant from the chamber 99, the nozzles 145 playing streams 146 of coolant against the supper surface of the extrusion 123.

A monorail conveyor, indicated generally at 148, can be used to bring the dies 118 to and from the press.

Operation

At the start of the operation the main ram 26 is retracted into the main cylinder 24 so that the main plunger 29 is fully retracted to the position shown in Figs. 1, 6 and 8. Likewise the container holder 61 is in its fully retracted position or toward the right as viewed in Figs. 1, 8 and 9, this positioning of the container holder 61 being effected by admitting pressurized fluid from the lines 78 into the blind bores 76 of the projecting ends of the two pistons 69. Reacting against the fixed pistons 74 this projects the pistons 69 and their rods 65 to the right, as viewed in Figs. 6, thereby to position the billet container holder 61 to the right as viewed in Fig. 1, this billet container holder sliding along the rails 33. At the start of the extrusion operation the slide 45 is in its extreme right hand position as viewed in Fig. 7, this being effected by introducing pressurized fluid into that end of the square cylinder 54 required to move the piston rod 55 so as to position the slide 45 at its right hand extremity as viewed in Fig. 7. At the start of the extrusion operation the cradles 92, 95 are also withdrawn to their extreme left hand position, as viewed in Figs. 1, 4 and 6, this positioning of the semicylindrical cradle or pusher members 92, 95 being effected by introducing pressurized fluid into the inboard ends of the cylinders 101 so as to retract the piston rods 103 and thereby draw the bridge shaped end head 104 for the outer semicylindrical cradle or pusher member 92 to its extreme left hand position as shown in Fig. 4. At this time quenching liquid can be supplied from the line 140, Fig. 6, into the semicylindrical chamber 99 between the inner and outer semicylindrical cradle or pusher members 92, 95, to be projected therefrom as streams from the orifices 144 and nozzles 145, Fig. 3. At this time it is also assumed that a follower 125 and dummy block 126 has been loaded on the loading arm 138.

As the first step, the cylinder billet 85 is charged from the glass table or incline 84 into the open mouth 82 of the semicylindrical shell 80, as shown in Fig. 7. The billet passes over the slightly raised lower lip 83 of the shell 80 so as to be reliably retained in the mouth 82 as the slide 45 moves to the left as viewed in Fig. 7, for the purpose of bringing the billet 85 into the line of extrusion. Such movement of the slide 45 is to its extreme left hand position, as viewed in Fig. 7, and is effected by introducing pressurized fluid into that end of the square cylinder 54 required to move the piston rod 55 and slide 45 in this direction.

This movement of the slide 45 brings the die or extrusion station 53 to the extreme left as viewed in Fig. 7 and hence at this time the die 118 can be lifted from the horseshoe-shaped die holder 119 to clean and oil the same and to replace it with a fresh die.

The billet 85 is then pushed axially into the liner 59 of the billet container 60 by the semicylindrical cradle or pusher members 92, 95. To actuate these semicylindrical cradle or pusher members 92, 95 pressurized fluid is introduced into the outboard ends of the cylinders 101, Fig. 4, thereby to project the piston rods and bridge-shaped end head 104 secured to the outboard end of the outer semicylindrical cradle or pusher member 92. This outer semicylindrical cradle or pusher member 92 slides along the bearing strips 89, Figs. 3 and 6, so as to cause the inner end of the inner semicylindrical cradle or pusher member 95 to engage the end of the billet contained in the mouth 82 of the shell 80 in the slide 45 and push it axially from this mouth into the bore of the liner 59 as illustrated in Fig. 8.

With the inner semicylindrical cradle or pusher member 95 still in engagement with the billet 85 contained within the liner 59 of the billet container 60 as shown in Fig. 8, the follower 125 and dummy block 126 are pushed into the liner 59. As assumed, these pieces have been placed upon the arm 138 of their loader and this arm 138 is swung so as to bring these parts into alinement with the bore of the liner 59 as illustrated in Fig. 8. These parts are pushed into the liner 59 by the main plunger 29 and for this purpose pressurized fluid is introduced into the main cylinder 24 so as to advance the main ram 26 and main plunger 29 to the extent required to push the follower 125 and dummy block 126 from the loader arm 138 into the liner 59 as best illustrated in Figs. 6, 8 and 9.

With the billet container 60 loaded with the billet 85, follower 125 and dummy block 126, the main plunger 29 and semicylindrical cradle or pusher members 92, 95 are retracted. The retraction of the main plunger 29 is effected by introducing fluid into the pull back cylinders 25 so as to retract the main ram 26. The retraction of the semicylindrical cradle or pusher members 92, 95 is effected by introducing pressurized fluid into the inboard ends of the cylinders 101 thereby to retract the piston rods 103 and hence the bridge-shaped end head 104 fast to the outboard end of the outer semicylindrical cradle or pusher member 92. The slide 45 is now free to move and is moved so as to bring its upset station 52 into line with the filled liner 59, this being effected by moving the slide 45 from its extreme left hand position, as viewed in Figs. 6 and 7, to its intermediate position. In this intermediate position the upset die 110 is brought into alinement with the liner 59 for the billet container 60. The billet container holder 61 is then moved to the left as viewed in Figs. 1, 9 and 10 so as to cause the annular ridge 111 of this upset die to engage the conical end 62 of the liner 59, this position of the parts being illustrated in Fig. 10. This movement of the billet container holder 61 is along the two rails 33 and is effected by introducing pressurized fluid through the lines 70, Fig. 6, into the two cylinders 68. This forces the pistons 69 to the left as viewed in Fig. 6 and hence retracts the two piston rods 65 so as to draw the billet container holder 61 along the rails 33 to the left as viewed in Figs. 6 and 9 and thereby establish contact between the annular ridge 111 of the upset die 110 and conical bevel 62 of the liner 59.

The upset die 110 now provides a blank wall or complete barrier at the beveled end of the liner 59 and the main plunger 29 is now advanced to upset the billet 85. For this purpose pressurized fluid is introduced into the main cylinder 24 to advance the main ram 26 and thereby project the plunger 29 into the liner 59. This upsetting movement of the ram causes the end of the billet to engage and conform to the shape of the upset die 110 as well as to expand the billet radially into complete peripheral contact with the liner 59 as illustrated in Fig. 10. This also forces the material, low cost metal or graphite, of which the follower 125 is composed to expand radially as well as to flow backwardly into the peripheral notches 135 of the dummy block 126 and thereby provide an interlock between the follower and dummy block. This condition of the billet, follower and dummy block is illustrated in Fig. 10.

The main plunger 29 is now withdrawn by introducing pressurized fluid into the corresponding end of the main cylinder 24 and the container holder 61 is now moved so as to break the contact between the upset die 110 and the end of the billet 85. This movement of the container holder is effected by introducing pressurized fluid through the lines 78, Fig. 6, into the blind bores 76 of the two pistons 69. This pressure reacts against the fixed pistons 74 so as to push the pistons 69 and piston rods 65 to the right as viewed in Fig. 6. This moves the container holder 61 along the rails 33 so as to disengage the liner 59 and billet 85 from the upset die and permit the slide 45 to be moved. This slide 45 is then moved to its extreme right hand position, this being the position illustrated in Fig. 7. In this position the die 118 is in line with the liner 59 of the billet container 60. The billet container holder 61 is then moved to the left as viewed in Fig. 6 so as to establish contact between the conical bevel 62 of the liner and the conforming ridge 120 of the die 118. Again this is effected by introducing pressurized fluid through the two lines 70, Fig. 6, into the cylinders 68. This moves the pistons 69 and their piston rods 65 to the left, as viewed in Fig. 6, thereby to move the container holder 61 along the rails 33 and to bring the conical bevel 62 of the liner 61 into engagement with the bevel ridge 120 of the die 118, this position of the parts being illustrated in Fig. 11.

The parts are now positioned for the extrusion step which is effected by full extrusion movement of the main plunger 29. This movement is effected by introducing pressurized fluid into the main cylinder 24 to project the ram 26 and plunger 29, the plunger 29 re-entering the liner 59 and applying sufficient force through the dummy block 126 and follower 125 to force the metal of the billet 85 through the opening 121 in the die and produce an extrusion 123 of the desired cross sectional shape. This extrusion passes through the backup blocks 116, Figs. 6 and 11, and through the flanged sleeve 39 which lines the opening 38 of the die platen 21 and thence passes under the bridge-shaped end head 104 of the semicylindrical cradle or pusher members 92, 95 onto the usual runout table (not shown). The extrusion formed on passing through the die opening 121 also passes over the semicylindrical cradle or pusher members 92, 95 and is quenched or sprayed with a coolant in so passing. This coolant is supplied from the line 140, Fig. 6, to the semicylindrical chamber 99 between the inner and outer parts of the semicylindrical cradle or pusher members 92, 95. From the chamber 99, Fig. 3, the liquid coolant emerges from the orifices 144 to impinge against the bottom of the extrusion 123. From this chamber 99 the coolant also emerges through the nozzles 145 in the form of the sprays 146 against the top of the extrusion. Accordingly, immediately after the extrusion is formed it is sprayed from all sides with coolant the result of which is to rapidly harden the metal so that the extrusion is produced in straighter form and has improved physicals. The movement of the plunger is continued until all of the metal of the billet 85, as well as a part of the material of the follower 125, has been extruded through the die opening 121, leaving only the discard 128 formed of the material of the follower 125 and which discard is united to the dummy block 126 through the peripheral recesses 135 provided in the later. This position of the parts is illustrated in Fig. 12.

The next step is that of severing the discard 128 and for this purpose the main plunger 29 is retracted in step with a corresponding movement of the container holder 61 along the rails 33. This withdrawal movement of the main plunger 29 is effected by introducing pressurized fluid into the corresponding end of the main cylinder 24, and this movement of the container holder 61 is effected by introducing pressurized fluid through the two lines 78 into the blind bores in the ends of the pistons 76. This pressure reacts against the fixed pistons 74 so as to project the pistons 69 and their rods 65 and thereby move the container holder 61 along the rails 33 to the right as viewed in Fig. 6 from the position shown in Fig. 12 to the position shown in Fig. 13.

At the same time the die 118 and the extrusion 123 are pushed back so as to maintain contact between the die and the container liner 59. This is effected by introducing pressurized fluid into the outboard ends of the cylinders 101 thereby to project the piston rods 103 and through the bridge-shaped end head 104 to move the semicylindrical pusher or cradle members 92, 95 along its bearing strips 89 and the key 90 into pressure contact with the end of the die 118. With the plunger 29 and container holder 61 moving to the right as viewed in Fig. 12 and with the semicylindrical cradle or pusher members 92, 95 pressing against the die 118, this die is moved out of its horseshoe shaped holder 119 so as to expose the neck of the extrusion adjacent the discard 128, as illustrated in Fig. 13. This neck is composed entirely of the material from which the follower 125 is formed so that all of the metal of the billet 85 is produced as a usable part of the extrusion 123.

With the parts positioned as illustrated in Fig. 13, the next step is the withdrawal of the semicylindrical cradle or pusher members 92, 95. This is effected by introducing pressurized fluid into the inboard ends of the cylinders 101 thereby to retract the piston rods 103 and hence, through the bridge-shaped end head 104, to move the semicylindrical cradle or pusher members 92, 95 along the bearing strips 89 out of the space between the die 118 and horseshoe-shaped die holder 119. The arm 132 is now swung about its pivot 133, Fig. 2, so as to bring the rotary saw blade 131, now driven by the motor 134, through this space between the die 118 and die holder 119, this sawing operation being illustrated in Fig. 14. The saw 131 is then withdrawn to the elevated position illustrated in Figs. 2 and 7.

The die 118 is now replaced in its horseshoe-shaped holder 119. For this purpose the main ram 29 and container holder 61 are moved in step with each other to the left as viewed in Fig. 15. The movement of the main ram 29 is effected by introduction of pressurized fluid into the corresponding end of the main cylinder 24. This movement of the container holder 61 is effected by introducing pressurized fluid through the lines 70 into the cylinders 68 and which acts against the pistons 69 to withdraw the piston rods 65 and hence move the container holder 61 along the rails 33 to the left as viewed in Figs. 6 and 15. The position of the parts at the completion of this step is illustrated in Fig. 15.

The discard 128 is now withdrawn from the die 118. For this purpose means (not shown) including a retractable or displaceable pin or tongue engaging the groove 117, retains the die 118 against being pulled axially out of the horseshoe-shaped die holder 119 and the container holder 61 is moved, in step with the main plunger 29, to the right. The movement of the plunger is effected by introducing pressurized fluid into the corresponding end of the main cylinder. This movement of the container holder 61 is effected by introducing pressurized fluid through the lines 78 into the blind bores 76 of the pistons 69, this pressure reacting against the fixed pistons 74 to project the pistons 69 and, through their rods 65, to move the container holder 61 along the rails 33 to the right and to the position illustrated in Fig. 16. Since the die 118 is held in the holder 119, this serves to pull the discard from the die.

The extrusion 123 is now run off so as to remove its severed end from the extrusion press and so as to leave the slide 45 free to be moved.

The slide 45 is then moved to its extreme left hand position as viewed in Fig. 7 so as to again bring the billet receiving station 51 into line with the liner 59 for the billet container 60, this station now being used to get rid of the discard. With the slide in this position the billet receiving shell 80 is in line with the discard 128 contained within the liner 59 and to transfer this discard from the liner to the billet receiving shell 80 the container holder 61 is moved toward the die platen 21 to effect engagement between the liner 59 and the rim of the billet receiving shell 80. This is effected by introducing pressurized fluid through the lines 70 into the 35 cylinders 68, Fig. 6, this pressure, through the piston 69 and piston rods 65, drawing the container holder 61 along the tracks 33 toward the die platen 21. The main plunger 29 is now projected, by introducing pressurized fluid into the corresponding end of the main cylinder 24, to push the discard 128, together with the attached dummy block 126 into the billet receiving shell 80.

At this time the die 118 which had just been used in the production of the extrusion 123 can be lifted from its horseshoe-shaped holder 119 at the left hand side of the press as viewed in Fig. 7 and placed on the monorail 145. The slide 45 is now in its extreme left hand position, as viewed in this figure, so as to render the die station 53 conveniently accessible. The die 118 so removed can be replaced with a freshly cleaned and oiled die for the production of the next extrusion.

Following this the main plunger 29 can be withdrawn to its extreme position by the introduction of pressurized fluid into the corresponding end of the main cylinder 24 and the container holder 61 is also moved away from the die platen 21 so as to free the slide 45. This movement of the container holder is effected by the introduction of pressurized fluid through the lines 78, Fig. 6, into the blind bore 76 at the end of the piston 69. This reacts against the fixed pistons 74 to project the pistons 69 and their piston rods 68 and hence move the container holder 61 along the rails 33 to the right as viewed in this figure.

The slide 45 is then moved to its extreme left hand position as shown in Fig. 7 by introduction of pressurized fluid into the corresponding end of the square cylinder 54. The discard 128 together with the attached dummy block 126 can then be pushed out of the billet receiving shell 80 so that a billet 85 can be loaded therein as previously described.

Upon raising the loaded arm 138 containing a fresh follower 125 and dummy block 126 the press is in the condition assumed at the start of this operation, and ready for another cycle of steps as described.

It will particularly be noted that only the small follower 125 and dummy block 126 are loaded between the container 60 and the main plunger 29, this requiring only a small loading arm 138 so that the main plunger 29 is required to be retracted only a short distance in order to accommodate this loading arm. If conventional practice were followed and the large billet 85 were also handled by the loading arm 138 the main plunger 29 would have to be retracted a correspondingly much greater distance which not only would require a longer main cylinder 24 and larger day-light opening and hence a longer and heavier press, but also the speed of the operating cycle would be delayed by the longer stroke required of the main plunger. In the practice of the present invention, this long stroke of the main plunger 29 to accommodate a large billet and its loading arm is eliminated by loading the billet from the opposite side of the container.

It will also be noted that the slide 45 forms an efficient and reliable billet loader. Thus the billet is conveniently transferred from the glass table or chute 84 directly into the end jaw 82 of the slide following which the slide is moved to bring the billet to the extrustion axis.

It will also be noted that the required large size of the slide 45 for billet loading also adapts it to other purposes, namely, to hold and present the upset die 110 to the billet; to hold and present the extrusion die 118 to the billet; to remove the used extrusion die and bring it to the monorail 148 for removal and replacement; for receiving the discard; and for transferring the discard to a place where it can be conveniently ejected.

It will also be noted that the semicylindrical pusher or cradle members 92, 95 in addition to pushing the billet 85 from the slide 45 into the liner 59 of the container 60, also perform a number of additional services. Thus, as shown in Fig. 9, they serve to back up the billet 85 while the follower 125 and dummy block 126 are being inserted; they serve to guide the extrusion leaving the die 118 as shown in Figs. 11 and 16; they serve to spray the emerging extrusion with a coolant as shown in Fig. 3; and they serve to push the die 118, together with the attached extrusion 123, backwardly as illustrated in Figs. 13 and 14 so that the discard can be severed by the saw 131.

I claim:

1. A metal extrusion press comprising: a cylinder platen and a die platen, the latter having a centrally disposed bore therethrough; a plurality of columns extending between the cylinder and die platens and holding the same in alined positions with respect to each other; a main ram and a main cylinder for axially moving said ram, said cylinder being secured to said cylinder platen; a plunger axially alined with and secured to said ram; a slide member between said platens and slidable along the face of said die platen across said bore; a piston and cylinder mounted for moving said member to different positions along said face; an extrusion die mounted at one end of said member and having at least one orifice for shaping work material passing through said die, the latter having a projecting outer ridge on one face thereof, the other end of said member having an opening formed therein adapted to receive a billet; a closed upset die mounted between the ends of said member, said upset die having a projecting ridge similar to that on said extrusion die; a billet container movable along the press axis between said member and said plunger and adapted to alternately engage the respective ridges of said extrusion die and said upset die in sealing relation thereto, said opening being alinable with the billet container cavity by movement of said member whereby a billet may be loaded in said cavity; a first piston with a blind cavity in one end and a piston rod secured to and projecting from the end of said piston opposite said blind cavity, said piston rod being secured to said billet container; a second cylinder secured to said die platen and accommodating said piston, said piston rod projecting through the bottom of said second cylinder; a fixed second piston mating with the bore of said blind cavity, said second piston having a fluid line centrally disposed therein communicating with said blind cavity; whereby, when fluid is admitted under pressure between said first piston and the bottom of said second cylinder and fluid is allowed to evacuate through said fluid line, said billet container is constrained to move toward said die platen; and whereby, when fluid is allowed to evacuate from said second cylinder and fluid under pressure is admitted to said blind cavity via said fluid line, said billet container is constrained to move away from said die platen.

2. Apparatus as in claim 1 and further including; a semicircular pusher and cradle assembly comprised of an inner member and an outer member bolted together in fluid tight manner so that a semicylindrical fluid chamber is formed between the inner and outer members, said outer member having a fluid inlet therethrough to said chamber, said inner member having a plurality of fluid outlet ports and a plurality of nozzles arranged to spray fluid from said chamber over items passing along the concave side of said inner member, one end of said inner member projecting beyond one end of said outer member and the other end of said outer member projecting beyond the other end of said inner member, said assembly being slidably disposed along the bottom of said centrally disposed bore with said one end of said inner member pointed toward said billet container; a bridge-like end head secured to said other end of said outer member; a fixed stand transverse said press axis and located a distance from said die platen opposite the face thereof away from said slide member; a plurality of rods secured to said fixed stand and extending through guide holes in said end head and on to said die platen; a third cylinder secured to said fixed stand and a third piston which is movable thereby; a second piston rod secured to said third piston and secured to said end head; whereby said third piston may be advanced to move and position said assembly according to the exigencies of press operation; said exigencies embracing the pushing of a billet from said opening formed in said slide member into said billet container cavity to load the same, the holding of said assembly in position beyond said extrusion die during extrusion so that the extruding product may be sprayed and quenched by fluid from said ports and nozzles, and, finally, the dislodging and pushing of said extrusion die from its position in said slide member.

References Cited in the file of this patent

UNITED STATES PATENTS

| | | |
|---|---|---|
| 408,377 | Cobb | Aug. 6, 1889 |
| 888,299 | Benjamin | May 19, 1908 |
| 1,317,238 | Summey | Sept. 30, 1919 |
| 2,075,803 | Dinzl et al. | Apr. 6, 1937 |
| 2,135,193 | Moorhead | Nov. 1, 1938 |
| 2,385,574 | Hyprath | Sept. 25, 1945 |
| 2,388,558 | Loewy | Nov. 6, 1945 |
| 2,429,525 | Rawlinson et al. | Oct. 21, 1947 |
| 2,720,970 | Roux | Oct. 18, 1955 |
| 2,803,215 | Edgecombe et al. | Aug. 20, 1957 |
| 2,863,557 | Munker | Dec. 9, 1958 |
| 2,883,049 | Arenz | Apr. 21, 1959 |

FOREIGN PATENTS

| | | |
|---|---|---|
| 1,044,934 | France | June 24, 1953 |
| 728,784 | Great Britain | Apr. 27, 1955 |
| 734,615 | Great Britain | Aug. 3, 1955 |